US008469542B2

(12) United States Patent
Zampini, II et al.

(10) Patent No.: US 8,469,542 B2
(45) Date of Patent: Jun. 25, 2013

(54) COLLIMATING AND CONTROLLING LIGHT PRODUCED BY LIGHT EMITTING DIODES

(76) Inventors: Thomas L. Zampini, II, Morris, CT (US); Mark A. Zampini, Morris, CT (US); Thomas L. Zampini, Morris, CT (US)

(*) Notice: Subject to any disclaimer, the term of this patent is extended or adjusted under 35 U.S.C. 154(b) by 459 days.

(21) Appl. No.: 12/015,376

(22) Filed: Jan. 16, 2008

(65) Prior Publication Data
US 2008/0174997 A1    Jul. 24, 2008

Related U.S. Application Data

(63) Continuation of application No. 10/920,347, filed on Aug. 18, 2004, now abandoned.

(60) Provisional application No. 60/571,895, filed on May 18, 2004.

(51) Int. Cl.
| F21V 9/00 | (2006.01) |
| F21V 1/00 | (2006.01) |
| F21V 5/00 | (2006.01) |
| B60Q 1/26 | (2006.01) |
| F21S 4/00 | (2006.01) |

(52) U.S. Cl.
USPC ...... 362/231; 362/555; 362/217.02; 362/227; 362/244; 362/249.01

(58) Field of Classification Search
USPC .................. 362/555, 217.02, 227, 231, 244, 362/245, 249.01–249.02
See application file for complete search history.

(56) References Cited

U.S. PATENT DOCUMENTS

| 4,139,770 | A |   | 2/1979  | Beyersdorf |
| 4,941,072 | A | * | 7/1990  | Yasumoto et al. ........ 362/249.06 |
| 5,032,960 | A | * | 7/1991  | Katoh ........................... 362/240 |
| 5,264,997 | A |   | 11/1993 | Hutchisson et al. |
| 5,465,199 | A |   | 11/1995 | Bray et al. |
| 5,561,346 | A |   | 10/1996 | Byrne |
| 5,607,227 | A | * | 3/1997  | Yasumoto et al. ........ 362/249.06 |
| 5,659,582 | A |   | 8/1997  | Kojima et al. |
| 5,783,909 | A |   | 7/1998  | Hochstein |
| 5,803,579 | A |   | 9/1998  | Turnbull et al. |

(Continued)

FOREIGN PATENT DOCUMENTS
WO    WO-03/017733 A1    2/2003

OTHER PUBLICATIONS

"1-Wire Products Deliver a Powerful Combination . . . ", Mixed-Signal Design Guide, Dallas Semiconductor Maxim, 2005, 7 pages.
"Conductivity with the BS2/OWL2", EME Systems, 2002, pp. 1-3.

(Continued)

*Primary Examiner* — David J Makiya
(74) *Attorney, Agent, or Firm* — Foley & Lardner LLP; Christopher J. McKenna (57) ABSTRACT

A light source channel is described. The light source channel includes an extrusion forming a channel having an open length and a light source positioned within the channel. A light transfer medium is positioned above the light source and covers the open length of the channel. The light transfer medium has a cross section. A method embodiment according to the present invention produces a light source channel by installing a light engine within a channel of an extrusion and covering the channel length with a light transfer medium above the light engine. The light transfer medium has a cross-section.

24 Claims, 3 Drawing Sheets

U.S. PATENT DOCUMENTS

| | | | |
|---|---|---|---|
| 5,909,429 A | 6/1999 | Satyanarayana et al. | |
| 5,947,587 A | 9/1999 | Keuper et al. | |
| 6,013,988 A | 1/2000 | Bucks et al. | |
| 6,016,038 A | 1/2000 | Mueller et al. | |
| 6,040,663 A | 3/2000 | Bucks et al. | |
| 6,094,014 A | 7/2000 | Bucks et al. | |
| 6,127,783 A | 10/2000 | Pashley et al. | |
| 6,147,458 A | 11/2000 | Bucks et al. | |
| 6,150,774 A | 11/2000 | Mueller et al. | |
| 6,157,093 A | 12/2000 | Giannopoulos et al. | |
| 6,166,496 A | 12/2000 | Lys et al. | |
| 6,194,839 B1 | 2/2001 | Chang | |
| 6,201,353 B1 | 3/2001 | Chang et al. | |
| 6,211,626 B1 | 4/2001 | Lys et al. | |
| 6,234,645 B1 | 5/2001 | Borner et al. | |
| 6,234,648 B1 | 5/2001 | Borner et al. | |
| 6,236,331 B1 | 5/2001 | Dussureault | |
| 6,238,065 B1 | 5/2001 | Jones | |
| 6,249,088 B1 | 6/2001 | Chang | |
| 6,250,774 B1 | 6/2001 | Begemann et al. | |
| 6,253,530 B1 | 7/2001 | Price et al. | |
| 6,288,497 B1 | 9/2001 | Chang et al. | |
| 6,292,901 B1 | 9/2001 | Lys et al. | |
| 6,299,328 B1 * | 10/2001 | Wilson | 362/223 |
| 6,299,329 B1 | 10/2001 | Mui et al. | |
| 6,304,464 B1 | 10/2001 | Jacobs et al. | |
| 6,305,818 B1 | 10/2001 | Lebens et al. | |
| 6,340,864 B1 | 1/2002 | Wacyk | |
| 6,340,868 B1 | 1/2002 | Lys et al. | |
| 6,384,545 B1 | 5/2002 | Lau | |
| 6,411,046 B1 | 6/2002 | Muthu | |
| 6,441,558 B1 | 8/2002 | Muthu et al. | |
| 6,443,592 B1 | 9/2002 | Unger et al. | |
| 6,445,139 B1 | 9/2002 | Marshall et al. | |
| 6,450,664 B1 * | 9/2002 | Kelly | 362/244 |
| 6,459,919 B1 | 10/2002 | Lys et al. | |
| 6,481,130 B1 * | 11/2002 | Wu | 40/546 |
| 6,489,731 B1 | 12/2002 | Bruning et al. | |
| 6,495,964 B1 | 12/2002 | Muthu et al. | |
| 6,507,158 B1 | 1/2003 | Wang | |
| 6,507,159 B2 | 1/2003 | Muthu | |
| 6,510,995 B2 | 1/2003 | Muthu et al. | |
| 6,513,949 B1 | 2/2003 | Marshall et al. | |
| 6,528,954 B1 | 3/2003 | Lys et al. | |
| 6,552,495 B1 | 4/2003 | Chang | |
| 6,576,881 B2 | 6/2003 | Muthu et al. | |
| 6,577,080 B2 | 6/2003 | Lys et al. | |
| 6,577,512 B2 | 6/2003 | Tripathi et al. | |
| 6,580,309 B2 | 6/2003 | Jacobs et al. | |
| 6,586,890 B2 | 7/2003 | Min et al. | |
| 6,596,977 B2 | 7/2003 | Muthu et al. | |
| 6,608,453 B2 | 8/2003 | Morgan et al. | |
| 6,609,813 B1 | 8/2003 | Showers et al. | |
| 6,617,795 B2 | 9/2003 | Bruning | |
| 6,621,235 B2 | 9/2003 | Chang | |
| 6,630,801 B2 | 10/2003 | Schuurmans | |
| 6,636,003 B2 | 10/2003 | Rahm et al. | |
| 6,639,368 B2 | 10/2003 | Sheoghong | |
| 6,641,284 B2 * | 11/2003 | Stopa et al. | 362/240 |
| 6,676,284 B1 | 1/2004 | Wynne Willson | |
| 6,692,136 B2 | 2/2004 | Marshall et al. | |
| 6,720,745 B2 | 4/2004 | Lys et al. | |
| 6,724,159 B2 | 4/2004 | Gutta et al. | |
| 6,734,639 B2 | 5/2004 | Chang et al. | |
| 6,741,351 B2 | 5/2004 | Marshall et al. | |
| 6,762,562 B2 | 7/2004 | Leong | |
| 6,777,891 B2 | 8/2004 | Lys et al. | |
| 6,788,011 B2 | 9/2004 | Mueller et al. | |
| 6,796,680 B1 | 9/2004 | Showers et al. | |
| 6,796,686 B2 | 9/2004 | Jacob et al. | |
| 6,801,003 B2 | 10/2004 | Schanberger et al. | |
| 6,806,659 B1 | 10/2004 | Mueller et al. | |
| 6,831,569 B2 | 12/2004 | Wang et al. | |
| 6,853,150 B2 | 2/2005 | Clauberg et al. | |
| 6,853,151 B2 | 2/2005 | Leong et al. | |
| 6,859,644 B2 | 2/2005 | Wang | |
| 6,860,628 B2 * | 3/2005 | Robertson et al. | 362/555 |
| 6,871,983 B2 * | 3/2005 | Jacob et al. | 362/364 |
| 6,880,952 B2 * | 4/2005 | Kiraly et al. | 362/218 |
| 6,922,022 B2 | 7/2005 | Bucks et al. | |
| 6,930,452 B2 | 8/2005 | De Krijger et al. | |
| 6,932,477 B2 | 8/2005 | Stanton | |
| 6,933,685 B2 | 8/2005 | Gutta et al. | |
| 6,933,767 B2 | 8/2005 | Bucks et al. | |
| 6,965,205 B2 | 11/2005 | Piepgras et al. | |
| 6,969,954 B2 | 11/2005 | Lys | |
| 6,972,525 B2 | 12/2005 | Bucks et al. | |
| 6,975,079 B2 | 12/2005 | Lys et al. | |
| 6,992,803 B2 | 1/2006 | Chang | |
| 6,998,594 B2 | 2/2006 | Gaines et al. | |
| 7,014,336 B1 | 3/2006 | Ducharme et al. | |
| 7,030,572 B2 | 4/2006 | Nijhof et al. | |
| 7,031,920 B2 | 4/2006 | Dowling et al. | |
| 7,038,398 B1 | 5/2006 | Lys et al. | |
| 7,038,399 B2 | 5/2006 | Lys et al. | |
| 7,064,498 B2 | 6/2006 | Dowling et al. | |
| 7,067,992 B2 | 6/2006 | Leong et al. | |
| 7,071,762 B2 | 7/2006 | Xu et al. | |
| 7,101,056 B2 * | 9/2006 | Pare | 362/190 |
| 7,113,541 B1 | 9/2006 | Lys et al. | |
| 7,118,248 B2 | 10/2006 | Wynne Willson | |
| 7,132,804 B2 | 11/2006 | Lys et al. | |
| 7,135,824 B2 | 11/2006 | Lys et al. | |
| 7,139,617 B1 | 11/2006 | Morgan et al. | |
| 7,140,752 B2 | 11/2006 | Ashdown | |
| 7,159,997 B2 * | 1/2007 | Reo et al. | 362/240 |
| 7,161,311 B2 | 1/2007 | Mueller et al. | |
| 7,161,313 B2 | 1/2007 | Piepgras et al. | |
| 7,161,556 B2 | 1/2007 | Morgan et al. | |
| 7,178,941 B2 | 2/2007 | Roberge et al. | |
| 7,180,252 B2 | 2/2007 | Lys et al. | |
| 7,186,003 B2 | 3/2007 | Dowling et al. | |
| 7,202,608 B2 | 4/2007 | Robinson et al. | |
| 7,202,613 B2 | 4/2007 | Morgan et al. | |
| 7,202,641 B2 | 4/2007 | Claessens et al. | |
| 7,204,622 B2 | 4/2007 | Dowling et al. | |
| 7,221,104 B2 | 5/2007 | Lys et al. | |
| 7,228,190 B2 | 6/2007 | Dowling et al. | |
| 7,231,060 B2 | 6/2007 | Dowling et al. | |
| 7,233,115 B2 | 6/2007 | Lys | |
| 7,233,831 B2 | 6/2007 | Blackwell | |
| 7,242,152 B2 | 7/2007 | Dowling et al. | |
| 7,253,566 B2 | 8/2007 | Lys et al. | |
| 7,255,457 B2 | 8/2007 | Ducharme et al. | |
| 7,255,458 B2 | 8/2007 | Ashdown | |
| 7,256,554 B2 | 8/2007 | Lys | |
| 7,262,559 B2 | 8/2007 | Tripathi et al. | |
| 7,267,461 B2 | 9/2007 | Kan et al. | |
| 7,274,160 B2 | 9/2007 | Mueller et al. | |
| 7,300,192 B2 | 11/2007 | Mueller et al. | |
| 7,308,296 B2 | 12/2007 | Lys et al. | |
| 7,309,965 B2 | 12/2007 | Dowling et al. | |
| 7,314,289 B2 | 1/2008 | Montagne | |
| 7,319,298 B2 | 1/2008 | Jungwirth et al. | |
| 7,323,676 B2 | 1/2008 | Duijve | |
| 7,329,998 B2 | 2/2008 | Jungwirth | |
| 7,350,936 B2 | 4/2008 | Ducharme et al. | |
| 7,352,138 B2 | 4/2008 | Lys et al. | |
| 7,352,339 B2 | 4/2008 | Morgan et al. | |
| 7,353,071 B2 | 4/2008 | Blackwell et al. | |
| 7,354,172 B2 | 4/2008 | Chemel et al. | |
| 7,358,679 B2 | 4/2008 | Lys et al. | |
| 7,358,681 B2 | 4/2008 | Robinson et al. | |
| 7,358,706 B2 | 4/2008 | Lys | |
| 7,358,929 B2 | 4/2008 | Mueller et al. | |
| 7,358,961 B2 | 4/2008 | Zwanenburg | |
| 7,387,405 B2 | 6/2008 | Ducharme et al. | |
| 7,388,665 B2 | 6/2008 | Ashdown | |
| 7,394,210 B2 | 7/2008 | Ashdown | |
| 7,420,335 B2 | 9/2008 | Robinson et al. | |
| 7,423,387 B2 | 9/2008 | Robinson et al. | |
| 7,432,668 B2 | 10/2008 | Zwanenburg et al. | |
| 7,443,209 B2 | 10/2008 | Chang | |
| 7,449,847 B2 | 11/2008 | Schanberger et al. | |
| 7,453,217 B2 | 11/2008 | Lys et al. | |
| 7,459,864 B2 | 12/2008 | Lys | |
| 7,462,997 B2 | 12/2008 | Mueller et al. | |

| | | |
|---|---|---|
| 7,463,070 B2 | 12/2008 | Wessels |
| 7,482,565 B2 | 1/2009 | Morgan et al. |
| 7,482,760 B2 | 1/2009 | Jungwirth et al. |
| 7,490,953 B2 | 2/2009 | Holten et al. |
| 7,490,957 B2 | 2/2009 | Leong et al. |
| 7,495,671 B2 | 2/2009 | Chemel et al. |
| 7,502,034 B2 | 3/2009 | Chemel et al. |
| 7,505,395 B2 | 3/2009 | Ashdown et al. |
| 7,506,997 B1 * | 3/2009 | Eriksson ............... 362/241 |
| 7,507,001 B2 | 3/2009 | Kit |
| 7,511,436 B2 | 3/2009 | Xu |
| 7,511,437 B2 | 3/2009 | Lys et al. |
| 7,515,128 B2 | 4/2009 | Dowling |
| 7,520,634 B2 | 4/2009 | Ducharme et al. |
| 7,521,872 B2 | 4/2009 | Bruning |
| 7,525,254 B2 | 4/2009 | Lys et al. |
| 7,538,499 B2 | 5/2009 | Ashdown |
| 7,542,257 B2 | 6/2009 | McCormick et al. |
| 7,550,931 B2 | 6/2009 | Lys et al. |
| 7,550,935 B2 | 6/2009 | Lys et al. |
| 7,557,521 B2 | 7/2009 | Lys |
| 7,569,807 B2 | 8/2009 | Matheson |
| 7,572,028 B2 | 8/2009 | Mueller et al. |
| 7,573,209 B2 | 8/2009 | Ashdown et al. |
| 7,573,210 B2 | 8/2009 | Ashdown et al. |
| 7,573,729 B2 | 8/2009 | Elferich et al. |
| 7,598,681 B2 | 10/2009 | Lys et al. |
| 7,598,684 B2 | 10/2009 | Lys et al. |
| 7,598,686 B2 | 10/2009 | Lys et al. |
| 7,619,370 B2 | 11/2009 | Chemel et al. |
| 7,652,236 B2 | 1/2010 | Cortenraad et al. |
| 7,654,703 B2 | 2/2010 | Kan et al. |
| 7,656,366 B2 | 2/2010 | Ashdown |
| 7,658,506 B2 | 2/2010 | Dowling |
| 7,659,673 B2 | 2/2010 | Lys |
| 7,659,674 B2 | 2/2010 | Mueller et al. |
| 7,665,883 B2 | 2/2010 | Matheson |
| 7,667,409 B2 | 2/2010 | Geerts et al. |
| 7,675,238 B2 | 3/2010 | Cortenraad et al. |
| 7,687,753 B2 | 3/2010 | Ashdown |
| 7,688,002 B2 | 3/2010 | Ashdown et al. |
| 7,689,130 B2 | 3/2010 | Ashdown |
| 7,703,951 B2 | 4/2010 | Piepgras et al. |
| 7,710,369 B2 | 5/2010 | Dowling |
| 7,712,926 B2 | 5/2010 | Matheson |
| 7,714,521 B2 | 5/2010 | Qian |
| 7,731,387 B2 | 6/2010 | Cortenraad et al. |
| 7,731,389 B2 | 6/2010 | Draganov et al. |
| 7,731,390 B2 | 6/2010 | Van Gorkom et al. |
| 7,737,643 B2 | 6/2010 | Lys |
| 7,738,002 B2 | 6/2010 | Ashdown et al. |
| 7,740,375 B2 | 6/2010 | Zou et al. |
| 7,766,489 B2 | 8/2010 | Duine et al. |
| 7,766,518 B2 | 8/2010 | Piepgras et al. |
| 7,772,787 B2 | 8/2010 | Ashdown et al. |
| 7,777,427 B2 | 8/2010 | Stalker, III |
| 7,781,979 B2 | 8/2010 | Lys |
| 7,802,902 B2 | 9/2010 | Moss et al. |
| 7,806,558 B2 | 10/2010 | Williamson |
| 7,808,191 B2 | 10/2010 | Wu |
| 7,809,448 B2 | 10/2010 | Lys et al. |
| 7,810,974 B2 | 10/2010 | Van Rijswick et al. |
| 7,845,823 B2 | 12/2010 | Mueller et al. |
| 7,850,347 B2 | 12/2010 | Speier et al. |
| 7,854,539 B2 | 12/2010 | Van Duijneveldt |
| 7,868,562 B2 | 1/2011 | Salsbury et al. |
| 7,878,683 B2 | 2/2011 | Logan et al. |
| 7,878,688 B2 | 2/2011 | Paulussen et al. |
| 7,893,631 B2 | 2/2011 | Speier |
| 7,893,661 B2 | 2/2011 | Ackermann et al. |
| 7,894,050 B2 | 2/2011 | Ashdown et al. |
| 7,906,917 B2 | 3/2011 | Tripathi et al. |
| 7,911,151 B2 | 3/2011 | Xu |
| 7,914,173 B2 | 3/2011 | Paulussen et al. |
| 7,926,985 B2 * | 4/2011 | Teng et al. ............... 362/373 |
| 8,022,632 B2 | 9/2011 | Schulz et al. |
| 8,026,673 B2 | 9/2011 | Lys |
| 2002/0074559 A1 | 6/2002 | Dowling et al. |
| 2003/0132721 A1 | 7/2003 | Jacobs et al. |
| 2003/0133292 A1 * | 7/2003 | Mueller et al. ............ 362/231 |
| 2004/0052076 A1 | 3/2004 | Mueller et al. |
| 2004/0090191 A1 | 5/2004 | Mueller et al. |
| 2004/0178751 A1 | 9/2004 | Mueller et al. |
| 2005/0063063 A1 * | 3/2005 | Ashdown ............... 359/599 |
| 2005/0207166 A1 * | 9/2005 | Kan et al. ............... 362/373 |
| 2005/0236998 A1 | 10/2005 | Mueller et al. |
| 2005/0275626 A1 | 12/2005 | Mueller et al. |
| 2006/0002110 A1 | 1/2006 | Dowling et al. |
| 2006/0076908 A1 | 4/2006 | Morgan et al. |
| 2006/0114201 A1 | 6/2006 | Chang |
| 2006/0146531 A1 * | 7/2006 | Reo et al. ............... 362/244 |
| 2006/0152172 A9 | 7/2006 | Mueller et al. |
| 2006/0221606 A1 | 10/2006 | Dowling |
| 2006/0262521 A1 | 11/2006 | Piepgras et al. |
| 2006/0274526 A1 | 12/2006 | Weston et al. |
| 2006/0290624 A1 | 12/2006 | Ashdown |
| 2007/0063658 A1 | 3/2007 | Van Der Veeken |
| 2007/0086912 A1 | 4/2007 | Dowling et al. |
| 2007/0115658 A1 | 5/2007 | Mueller et al. |
| 2007/0145915 A1 | 6/2007 | Roberge et al. |
| 2007/0153514 A1 | 7/2007 | Dowling et al. |
| 2007/0230159 A1 | 10/2007 | Cortenraad et al. |
| 2007/0258240 A1 | 11/2007 | Ducharme et al. |
| 2007/0273290 A1 | 11/2007 | Ashdown et al. |
| 2008/0042599 A1 | 2/2008 | Ashdown |
| 2008/0043464 A1 | 2/2008 | Ashdown |
| 2008/0048582 A1 | 2/2008 | Robinson |
| 2008/0062413 A1 | 3/2008 | Ashdown et al. |
| 2008/0089060 A1 | 4/2008 | Kondo et al. |
| 2008/0094005 A1 | 4/2008 | Rabiner et al. |
| 2008/0122386 A1 | 5/2008 | De Brouwer et al. |
| 2008/0136331 A1 | 6/2008 | Schmeikal |
| 2008/0136796 A1 | 6/2008 | Dowling |
| 2008/0140231 A1 | 6/2008 | Blackwell et al. |
| 2008/0164826 A1 | 7/2008 | Lys |
| 2008/0164854 A1 | 7/2008 | Lys |
| 2008/0167734 A1 | 7/2008 | Robinson et al. |
| 2008/0183081 A1 | 7/2008 | Lys et al. |
| 2008/0239675 A1 | 10/2008 | Speier |
| 2008/0265797 A1 | 10/2008 | Van Doorn |
| 2008/0278092 A1 | 11/2008 | Lys et al. |
| 2008/0278941 A1 | 11/2008 | Logan et al. |
| 2008/0290251 A1 | 11/2008 | Deurenberg et al. |
| 2008/0297066 A1 | 12/2008 | Meijer et al. |
| 2008/0298330 A1 | 12/2008 | Leitch |
| 2008/0315798 A1 | 12/2008 | Diederiks et al. |
| 2009/0002981 A1 | 1/2009 | Knibbe |
| 2009/0021175 A1 | 1/2009 | Wendt et al. |
| 2009/0021182 A1 | 1/2009 | Sauerlaender |
| 2009/0072761 A1 | 3/2009 | Wessels |
| 2009/0128059 A1 | 5/2009 | Joosen et al. |
| 2009/0134817 A1 | 5/2009 | Jurngwirth et al. |
| 2009/0160364 A1 | 6/2009 | Ackermann et al. |
| 2009/0168415 A1 | 7/2009 | Deurenberg et al. |
| 2009/0179587 A1 | 7/2009 | Van Der Veen et al. |
| 2009/0179596 A1 | 7/2009 | Willaert et al. |
| 2009/0189448 A1 | 7/2009 | Verschueren |
| 2009/0224695 A1 | 9/2009 | Van Erp et al. |
| 2009/0230884 A1 | 9/2009 | Van Doorn |
| 2009/0243507 A1 | 10/2009 | Lucero-Vera et al. |
| 2009/0278473 A1 | 11/2009 | Van Erp |
| 2009/0284174 A1 | 11/2009 | Sauerlander et al. |
| 2009/0321666 A1 | 12/2009 | Hilgers |
| 2010/0007600 A1 | 1/2010 | Deurenberg et al. |
| 2010/0026191 A1 | 2/2010 | Radermacher et al. |
| 2010/0045478 A1 | 2/2010 | Schulz et al. |
| 2010/0072901 A1 | 3/2010 | De Rijck et al. |
| 2010/0072902 A1 | 3/2010 | Wendt et al. |
| 2010/0079085 A1 | 4/2010 | Wendt et al. |
| 2010/0079091 A1 | 4/2010 | Deixler et al. |
| 2010/0084995 A1 | 4/2010 | Baaijens et al. |
| 2010/0091488 A1 | 4/2010 | Ijzerman et al. |
| 2010/0094439 A1 | 4/2010 | Van De Meulenhof et al. |
| 2010/0102732 A1 | 4/2010 | Peeters et al. |
| 2010/0117543 A1 | 5/2010 | Van Der Veen et al. |
| 2010/0117656 A1 | 5/2010 | Snelten |
| 2010/0118531 A1 | 5/2010 | Montagne |
| 2010/0127633 A1 | 5/2010 | Geerts et al. |

| | | | |
|---|---|---|---|
| 2010/0134041 A1 | 6/2010 | Radermacher et al. |
| 2010/0134042 A1 | 6/2010 | Willaert |
| 2010/0148689 A1 | 6/2010 | Morgan et al. |
| 2010/0164399 A1 | 7/2010 | Radermacher et al. |
| 2010/0165618 A1 | 7/2010 | Vissenberg et al. |
| 2010/0171771 A1 | 7/2010 | Otte et al. |
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0231133 A1 | 9/2010 | Lys |
| 2010/0231363 A1 | 9/2010 | Knibbe |
| 2010/0244707 A1 | 9/2010 | Gaines et al. |
| 2010/0244734 A1 | 9/2010 | Van Herpen et al. |
| 2010/0259182 A1 | 10/2010 | Man et al. |
| 2010/0264834 A1 | 10/2010 | Gaines et al. |
| 2010/0271843 A1 | 10/2010 | Holten et al. |
| 2010/0289532 A1 | 11/2010 | Wendt et al. |
| 2010/0301780 A1 | 12/2010 | Vinkenvleugel |
| 2010/0308745 A1 | 12/2010 | Delnoij |
| 2011/0025205 A1 | 2/2011 | Van Rijswick et al. |
| 2011/0025230 A1 | 2/2011 | Schulz et al. |
| 2011/0035404 A1 | 2/2011 | Morgan et al. |
| 2011/0042554 A1 | 2/2011 | Hilgers et al. |
| 2011/0090684 A1 | 4/2011 | Logan et al. |
| 2011/0095694 A1 | 4/2011 | Justel et al. |
| 2011/0285292 A1 | 11/2011 | Mollnow et al. |
| 2011/0291812 A1 | 12/2011 | Verbrugh |
| 2012/0019670 A1 | 1/2012 | Chang et al. |

OTHER PUBLICATIONS

"Dimmable Fluorescent Ballast", ATABRFBKIT/EVLB001, User Guide, ATMEL, 2007, pp. 1-33.

"High-side current sensing for driving a string of white LEDs", EDN, 1 page.

"Understanding Boost Power Stages in Switchmode Power Supplies", Application Report, Texas Instruments, Mixed Signal Products, Mar. 1999, pp. 1-28.

"Understanding Buck Power Stages in Switchmode Power Supplies", Application Report, Texas Instruments, Mixed Signal Products, Mar. 1999, pp. 1-32.

Barberis, C. "Precision current sink costs less than $20" EDN Design Ideas.

Bellcomb Technologies Incorporated, "Edges, Joiners, Attachments", Web Adress: http://www.bellcomb.com/caps/edges.htm, Apr. 22, 2007, pp. 1-3.

Bookmarks Menu—Controllers/Wireless—Design Ideas, dated Dec. 6, 2012, 1 pg.

Bowling, S. "Buck-Boost LED Driver Using the PIC16F785 MCU", Microchip, AN1047, 2006, pp. 1-12.

By Staff, DALI Delivers Control and Cost Savings, Headaches too, Consulting-Specifying Engineer, Jun. 2002; 2 pages.

Canny, D. "Controlling slew times tames EMI in offline supplies", EDN Design Ideas, Nov. 14, 2002.

Control Freak Addict Data Sheer, Copyright 2008, Creative Lighting, 5 pages.

Curtis, K. "High Power IR LED Driver Using the PC16C781/782", Microchip, TB062, 2002, pp. 1-8.

CybroTech, Managing Lights with Dali, TN-012, rev 2, Cybrotech Ltd., 2007, 11 pgs.

Cypress Perform, Implementing and Integrated DMX512 Receiver, Item ID: 39762, Dec. 16, 2009, 1 pg.

Cypress Semiconductor Corporation, PowerPSoC (R) Intelligent LED Driver, Doc. No. 001-46319, Rev. *G, 2009.

Dali-AG website, Dali at work, 1 pg.

Davidovic, et al., Lead-Acid Battery Charger Becomes a Solution in a Microntroller, The Authority on Emerging Technologies for Design Solutions, Mar. 2007, 2 pages.

Davmark Ltd., Dali-Protocol, 2006, 6 pages.

Di Jasio, "A Technique to Increase the Frequenecy Resolution of PICmicro MCU PWM Modules", Microchip, AN1050, 2006, pp. 1-10.

Dietz, et al. "Very Low-Cost Sensing and Communication Using Bidirectional LEDs", Mitsubishi Electric Research Laboratories, Jul. 2003, 19 pgs.

Distler, T. "LED Effects Stream TM v2.0 Protocol (Revision C)", Jun. 2, 2005, pp. 1-5.

Dunn, J. "Matching MOSFET Drivers to MOSFETs", Microchip, AN799, 2004, pp. 1-10.

Fosler, R. "The RS-232/DALI Bridge Interface", Microchip, AN811, 2002, pp. 1-8.

Fosler, R. "Use a microcontroller to design a boost converter", EDN design ideas, Mar. 4, 2004, pp. 74-75.

Fosler, R., et al. "Digitally Adressable DALI Dimming Ballast", Microchip, AN809, 2002, pp. 1-18.

Ghulyani, L. "Simple MPPT-Based Lead Acid Charger Using bq2031", Texas Instruments, Dec. 2009, pp. 1-5.

Google Search Results for dali query group, search completed on Apr. 8, 2010, accessed at google.com, http://www.google.com/search?hl=en&client=firefox-a&rls=org.mozilla:en-, 2 pages.

Hardwick, M. "DC power wire also carries clock or data", EDN Design Ideas.

Hexcel Composites, "Sandwich Panel Fabrication Technology", Web Adress: http://www.hexcel.com/NR/rdonlyres/B4574C2C-0644-43AC-96E2-CC15967A4b)5/4547 Sandwich Fabrication.pdf, Jan. 1997, pp. 1-16.

High-Side Current Monitor, ZETEX, Apr. 2001, ZXCT1009, Issue 3, pp. 1-8.

Implementing Infrared Object Detection, http://web.archive.org/web/20080528042614rejwww.seattlerobotics.org/guide/infrared.html, original publication date known, retrieved Apr. 7, 2010, seattlerobotics.org, 4 pages.

Jackson, S. "Circuit protects bus from 5V swings", EDN Design Ideas, Nov. 14, 2002.

Klepin, K. "Temperature Compensation for High Brightness LEDs using EZ-Color (TM) and PSoC Express", Cypress Perform, AN14406, Aug. 10, 2007, pp. 1-4.

Kremin, V. et al. "Multichannel LED Dimmer with CapSense Control—AN13943", Cypress Perform, Jul. 20, 2007.

Kropf, B. "Firmware—RGB Color Mixing Firmware for EZ-Color (TM)—AN16035", Cypress Perform, Jun. 13, 2007, pp. 1-7.

Lager, A. "Use a 555 timer as a switch-mode power supply", EDN Design Ideas, Nov. 14, 2002.

Lee, M. Shunt Battery Charger Provides 1A Continuous Current, EDN Magazine, 1997.

Locher, R. "Introduction to Power MOSEFETs and their Applications", Fairchild Semiconductor (TM), Application Note 558, Rev B, Oct. 1998, 15 pgs.

Miller, R. "Digitally adressable lighting interface protocol systems interoperability for lower costs and greater design flexibility", RNM Engineering, Inc., Apr. 2003, pp. 1-20.

Nell, S. "VCO uses programmable logic", EDN Design Ideas, Nov. 14, 2002.

News & Events DALI Digital addressable lighting interface lamp luminaire control, accessed at http://www.dali-ag.org/ on Apr. 8, 2010, original publication date unknown, updated Apr. 8, 2010, 1 pg.

O'Loughlin, M. "350-W, Two-Phase Interleaved PFC Pre-regulator Design Review", Texas Instruments, Application Report, Revised Mar. 2007, pp. 1-.

O'Loughlin, M., PFC Pre-Regulator Frequency Dithering Circuit, Texas Instruments, May 2007, pp. 1-8.

Perrin, R. "Inexpensive relays form digital potentiometer", EDC—Design Ideas.

Perrin, R. Inexpensive Relays Form Digital Potentiometer, EDN Design Ideas, 1998, 2 pages.

Petersen, A. "Harness solar power with smart power-conversion techniques", EDN, Green Electronics designfeature, Feb. 4, 1999, pp. 119-124.

Prendergast, P. "How to Design a Three-Channel LED Driver", Cypress Perform, Jan. 2008, pp. 1-9.

Renesas, R8C/25 Demonstration Example for Dali Lighting Protocol Stack, REU05BOO77-0100/Rev. 1.00, Jul. 2008, 14 pgs.

Richardson, C., Matching Driver to LED, National Semiconductor, Jan. 2008, 5 pgs.

Richardson. C., LM3404 Driving a Seoul Semi Zpower P4 1A LED-RD-134, National Semiconductor, Apr. 2007, 6 pages.

Shanmugam, S. "Design of a linear Fresnel lens system for solar photovoltaic electrical power source", Center for Robotics Research.

Shill, M. "Simple logic probe uses bicolor LED", EDN Design Ideas.

Software Design Specification, Z-Wave Protocol Overview, Z wave the wireless language, Zensys A/S, May 9, 2007, pp. 1-16.

Soundlight, Operating Manual, DALI and DMX Dekoder 7064A-H Mk1, 2008, 8 pgs.

Takahashi A., Methods and Features of LED Drivers, National Semiconductor, Mar. 2008, 3 pgs.

Universal Powerline Bus Communication Technology, Overview, PCS Powerline Control Systems UPB (Universal Powerline Bus), Jan. 8, 2002, pp. 1-13.

UPB Technology Description, PCS—Powerline Control Systems, UPB (Universal Powerline Bus), Version 1.4, Apr. 16, 2007, 68 pages.

Use Gate Charge to Design the Gate Drive Circuit for Power MOSEFETs and IGBTs, International Rectifier, Application Note AN-944, 5 pgs.

Van Dorsten, Arian, A Low Cost Step-up Converter by IC 555, posted Jul. 21, 2007, http://www.eleccircuit.comla-low-cost-step-up-converter-by-ic-5551, retrieved Apr. 7, 2010, 2 pages.

Walma, K., Dali: Forerunner of Today's Breakthrough Lighting Technology, Feb. 2007, 2 pages.

Wikipedia, Digital Addressable Lighting Interface, original publication date unknown, Retrieved from: Retrieved from "http://en.wikipedia.org/wikiJDigital_Addressable_Lighting_Interface" accessed on Apr. 8, 2010, 3 pages.

Witt, J. "Switched-capacitor regulator provides gain", EDN Design Ideas.

Wojslaw, C. "DPP adds versatility to VFC", EDN, design ideas, Nov. 14, 2002, pp. 99-110.

Young, R. "Power circuit terminates DDR DRAMs", EDN Design Ideas, Nov. 14, 2002.

Zarr, R. Driving High-Power LEDs, Machine Design, Oct. 2007, 3 pages.

Zensys ASCII Interface, VIZIA, 2007.

ZensysR ASCII interface, VIZIA RF, Aug. 1, 2007, 12 pgs.

Z-Wave Vizia Etc thread, retrieved at http://groups.google.com/group/comp.home.automation/browse_thread/thread/449c2c66934dfSfb/fSI12116a8231aa1?lnk=st&q=z-wave&rnum=98#fSI12116a8231aa1, www.ztech.com, 18 pages.

* cited by examiner

COLLIMATING AND CONTROLLING LIGHT PRODUCED BY LIGHT EMITTING DIODES

RELATED APPLICATIONS

The present application hereby claims the benefit of priority of U.S. patent application Ser. No. 10/920,347, entitled "Collimating and Controlling Light Produced by Light Emitting Diodes", filed on Aug. 18, 2004, which claims the benefit of U.S. Provisional Application No. 60/571,895, filed on May 18, 2004, and hereby incorporates both of these applications herein in their entirety by reference.

FIELD OF THE INVENTION

The present invention relates to collimating and controlling light produced by light emitting sources, and more particularly, to the use of a light transfer medium such as half round lenses and extrusions to collimate and control light produced by light emitting sources, such as light emitting diodes (LEDs), organic light emitting diodes (OLEDs), and light emitting polymers (LEPs).

BACKGROUND

It is known in the art to use LEDs as a light source. Existing linear LED-based light source systems inefficiently scatter and diffuse light within a containing light fixture. It is known that high power LEDs require external/additional heat sinking for transferring heat away from the LEDs in order to promote longevity and efficiency of the LEDs.

SUMMARY

An embodiment according to the present invention provides a light source channel including an extrusion forming a channel having an open length and a light engine positioned within the channel. A light transfer medium positioned above the light engine covers the open length of the extrusion channel. The light transfer medium has a cross section. The extrusion can be of any length, shape, or size.

In a method aspect, an embodiment according to the present invention produces a light source channel by installing a light engine within a channel of an extrusion and covering the channel length with a light transfer medium above the light engine. The light transfer medium has a cross-section.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism according to an embodiment of the present invention collimates and controls light produced by a light emitting source, e.g., LEDs, OLEDs, and LEPs.

Figure 1:
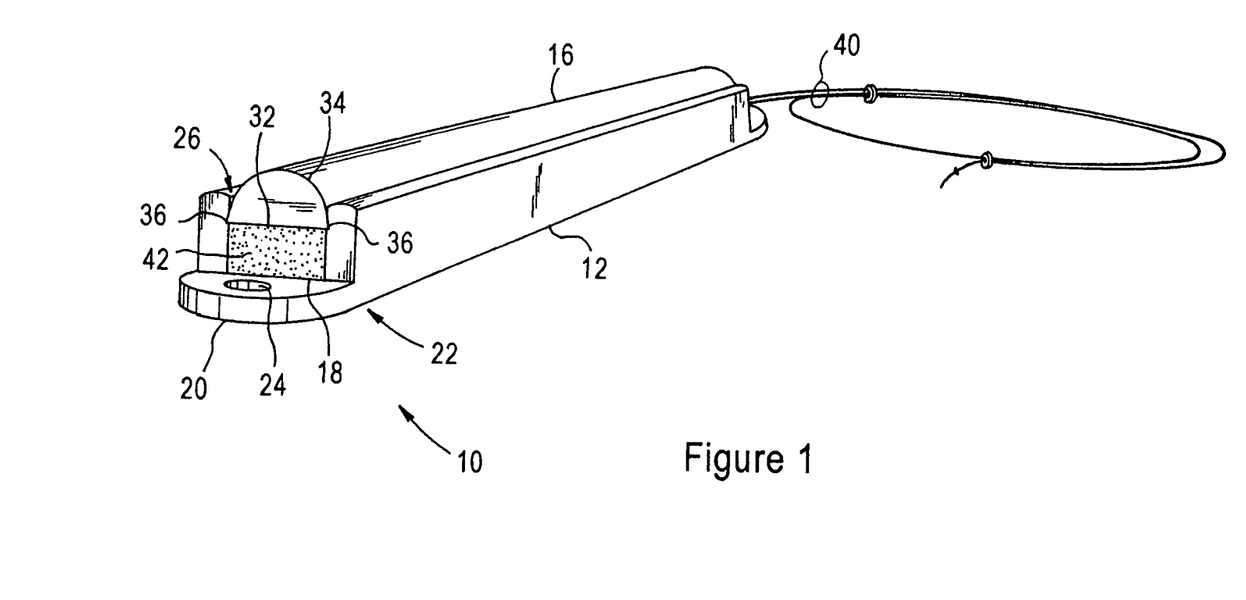
FIG. 1 is a perspective view of an embodiment according to the present invention.

As depicted in FIG. 1, a light source channel 10 according to the present invention includes an extrusion 12, e.g., an aluminum or other metallic material-based extrusion, herein referred to as an "extrusion", a light engine 14 (FIG. 3) having both high and low power, and a light transfer medium 16, e.g., a solid acrylic, polycarbonate, or any other clear plastic/composite half-round. User needs and/or application-specific requirements determine the length of extrusion 12. In one embodiment, extrusion 12 may be cut to any length desired and similarly for light transfer medium 16.

Extrusion 12 includes a channel 18 having a U-shaped cross-section and a pair of attachment ears 20 at either end of extrusion 12. Bottom portion 22 of extrusion 12 extends beyond channel 18 on each end of light source channel 10 and include a defined through-hole 24 for fixing light source channel 10 in position, e.g., using screws, bolts, etc. Light transfer medium 16 is positioned at an upper end 26 of channel 18, corresponding to the open portion of the U-shaped cross-section.

Light engine 14 (FIG. 3) includes LEDs 28 (FIG. 3) mounted, via surface mount, through holes, etc., to a circuit board 30, e.g., a metal core printed circuit board (MCPCB), fiber based PCB, or other circuit board, and circuit board 30 is mounted to the base of extrusion channel 18, e.g., using screws, epoxy, or other attaching mechanism. In one embodiment, an electrically neutral, thermally conductive paste/grease or a thermally conductive epoxy is applied between the extrusion and circuit board 30. In another embodiment, light engine 14 includes OLEDs and/or LEPs in place of or in addition to LEDs 28.

In an alternate embodiment, LEDs 28 are mounted with an FR4 PCB (or flexible circuit as referenced in U.S. Provisional Patent Application No. 60/481,387 filed Sep. 17, 2003, incorporated by reference herein in its entirety) with the slugs of LEDs 28 epoxied directly to the extrusion 12. In this embodiment, extrusion 12 serves as a heat sink for high brightness LEDs 28.

Light transfer medium 16 is a half-round, i.e., semi-circular cross-section shaped, substantially translucent material, e.g., a clear plastic or composite material, having a flat bottom side 32 and a rounded top side 34. As described above, light transfer medium is substantially coextensive with extrusion channel 18. Light transfer medium 16 is polished on bottom side 32 and top side 34 to promote optimal light transfer with minimal diffusion. A securing medium (not shown), e.g., an optical grade epoxy, potting material or any other securing mechanism, securely mounts light transfer medium 16 to extrusion 12 with flat, bottom side 32 positioned slightly above or on the heads of the LEDs 28 and substantially covering upper end 26 of extrusion channel 18.

Additionally, a pair of opposing grooves 36 formed in the inner surface of extrusion channel 18 toward the upper end 26 of the arms forming the U-shaped extrusion channel maintain light transfer medium 16 in position. That is, the corners of light transfer medium 16 formed at the intersection of bottom side 32 and top side 34 fit within opposing grooves 36 preventing the light transfer medium from being removed and/or falling out, depending on the position of light source channel 10. Light transfer medium 16 slides into either end of extrusion channel 18 and within the opposing grooves 36.

In another embodiment, light transfer medium 16 is installed into light source channel 10 via a small ledge on extrusion 12 on which the light transfer medium sits and is adhered to the extrusion via an epoxy, e.g., an ultraviolet (UV) light-cured acrylic (see Dymax <<http://www.dymax.com>>), to the extrusion for rapid and automated manufacturing. In another embodiment, U-shaped channel 18 is formed from a plastic composite and includes a small ledge on which light transfer medium 16 is positioned. Light transfer medium 16 is locked into place by a plastic trim bezel (not shown) which snaps into U-shaped channel 18 overtop light transfer medium 16.

Light source channel 10 is designed to be versatile featuring several ways to control the light output and emitting angles of the LEDs 28. By increasing the diameter of the light transfer medium 16 positioned over LEDs 28, the emitting angle of the light is increased, thus making a less collimated linear beam. By decreasing light transfer medium 16 diameter, the focus and collimation of the beam is increased.

Another way light is controlled in the light source channel 10 is by varying the height of extrusion 12, i.e., the depth of the U-shaped cross-section, and the distance that the bottom of light transfer medium 16 is from the surface of LED 28. Increasing the air gap between the LED die and the bottom of light transfer medium 16 adjusts the light emitted by light source channel 10 to be more diffused and less collimated. When the light transfer medium 16 is closest to the LED die, the light emitted by light source channel 10 is most collimated. Moving light transfer medium 16 further away, i.e., increasing the height of the extrusion channel 18, increases the emitting angle of light emitted from the light source channel 10 and the emitted light appears more diffused. In an alternate embodiment, a reflector or plating (not shown) within the interior of extrusion 12 (such as application of a surface treatment process as in ALZAK available from the Aluminum Company of America or chrome) may also be used to help guide the light into the collimator, i.e., light transfer medium 16, and minimize loss and absorption of light.

In still another embodiment according to the present invention, a reflective or mirrored strip positioned inside of extrusion 12 increases the efficiency of light emitted from light source channel 10. Some light from the light source, i.e., light engine 14, reflects back from the optic or emits from the side of the light source, i.e., light engine 14.

In one embodiment, addition of a reflector 38 (FIG. 3) on an upper surface of circuit board 30 increases the efficiency of light emitted from light source channel 10 by reflecting light back out rather than being absorbed by the extrusion 12 or light engine 14. The reflective/mirrored material comprising reflector 38 extends the length of extrusion channel 18 while having holes, e.g., cut, drilled, punched, etc., positioned where reflector 38 slides over the top of LEDs 28 exposing only the lens of LED 28 or the part of LED 28 actually emitting light. In further embodiments, reflector 38 is either adhered into place or mechanically fastened.

A pair of electrical conductors 40 provide power from a power source (not shown) to light engine 14.

In general, the overall performance of light emitted from LEDs varies due to manufacturing variables. The wavelength of light emitted from LEDs, especially phosphor-based white LEDs varies significantly enough to be detected by the human eye. The quality and consistency of white light is an important aspect of lighting with LEDs for various applications including general lighting, and often times in LED arrays and wall washes (especially against white or plain backgrounds) visible Kelvin temperature variations are noticeable and unpleasing to the eye. The color of white light varies from yellowish-warm white to a cool, blue white; therefore, manufactured LEDs are sorted by luminous output, voltage, and often most importantly color in a process called "binning." Depending on the process and method used for binning, LED light output results vary drastically.

Light transfer medium 16, e.g., the linear optic or half-round described above, utilized in embodiments according to the present invention helps not only to reduce the point sources of visible color temperature variations, but also helps to soften the variations by mixing color variations of more than one LED 28 while evenly collimating the beam of light emitted from light source channel 10. Mixing two varying Kelvin temperature light outputs results in the emission of an average Kelvin temperature light. When the light enters the light transfer medium 16, some of the light is reflected internally within the medium 16 in an effect known as total internal reflection (TIR).

Typically, light emitted from most LEDs is considered directional meaning light is emitted in a forward direction. Back light, or light emitted from all angles as in the case of an incandescent bulb or fluorescent tube where light is emitted in 360 degrees, is minimized. Therefore, in one embodiment, most of the light emitted from LEDs 28 in the light source channel 10 is at an angle perpendicular or close to perpendicular to light transfer medium 16. When the emitted light enters light transfer medium 16, some of the light refracts through medium 16 and some reflects internally. In this situation, the light enters a more optically dense medium, i.e., light transfer medium 16, heading towards a less dense medium, i.e., air. Assuming the angle at which the beam is directed upwards has a angle of incidence of 0 degrees, at an angle of incidence close to 0 degrees, most of the light energy is transmitted across the boundary into the air and very little is reflected. However, some of the light in light transfer medium 16 reflects internally within light transfer medium 16. Light transmitted within light transfer medium 16 at larger angles of incidence increases the amount of reflection and decreases the amount of refraction. In this case, the angle of incidence is increased and when the angle of incidence is equal to or greater than the critical angle for a given combination of materials, the light reflects internally within light transfer medium 16. For example, assuming a combination of water and air materials, the critical angle at the water-air boundary is 48.6 degrees. At the point at which the angle of incidence in water reaches the critical value, the refracted ray of light lies along the boundary having a 90 degree angle of refraction. For any angle of incidence greater than the critical angle, light undergoes total internal reflection. In effect, the color temperature or wavelength of light is scattered/mixed through medium 16 and light is collimated evenly without hotspots or variations in color temperature as in the case where individual collimating optics are used over each LED-28.

A light transfer medium 16 as utilized in embodiments according to the present invention reduces the visual appearance of variation in LED colors due to the angle at which light is emitted from the light source channel 10. Instead of being tightly collimated at a narrow angle as with most light transfer mediums which utilize the LED as a point source with an individual collimating optic, medium 16 collects and transmits light along its length while mixing any varying Kelvin temperatures or wavelengths of light and eliminating any obtrusive color spots.

The above mentioned system is practical in a myriad of linear lighting applications including, but not limited to, signage side lighting, refrigeration lighting, stair lighting, wall washing, and cove lighting.

In both of the above-mentioned embodiments, extrusion 12 serves as a necessary heat sink for high brightness LEDs 28. Depending on the number of LEDs 28 assembled in extrusion 12, the extrusion may or may not be a sufficient heat sink to keep the junction temperature of the LED dies at a desirable level at the ambient temperature of operation to promote the longevity of the LEDs 28. High power LEDs 28 (or other LEDs) as used in an embodiment according to the present invention need external heat sinking (see Lumileds AB07 "Lumen Maintenance of White Luxeon Power Light Sources," AB23 "Thermal Design Considerations for Luxeon 5W Power Light Sources," "The 10 Myths about LEDs and the Luxeon Difference" (Specifically Myth 2)). Therefore, the LEDs 28 in an embodiment of the present invention utilize a thermally conducting extrusion 12, as mentioned previously, most commonly made/extruded/formed/cast out of aluminum. Depending on outside factors of the system including, but not limited to, the thermal resistance of the epoxy used, the thermal conductivity of extrusion 12, the mass of extrusion 12, the surface area of extrusion 12, and the operating temperature/ambient of the system environment, the light source channel 10 may or may not require external heat sinking. In most applications utilizing higher power LEDs (greater than ½ Watt), a plurality of tightly spaced LEDs, or an application requiring high temperature operating environments relative to the maximum LED junction temperature, an external heat sink will be required. Most system design considerations depend on the environment of use, i.e., ambient operating temperature and the desired/necessary lifetime of the system. For example, a certain aluminum 12" extrusion 0.75 wide, and 5" deep with 9W of LED power if powered in a normal ambient (70F) environment requires external heat sinking to promote LED life longevity. However, the same aluminum strip used as a drawer light in a freezer where the ambient is below 0° F. and the light is only powered for short periods of time (time a drawer is opened) requires no additional heat sinking because the environment acts as an active cooling system. However, in either case, extrusion 12 is made of a thermally conducting material, and the LEDs 28 are in contact with this material.

The size, shape, length, and design of extrusion 12 are mostly dictated by the application of the system. In some cases, grooves are cut/cast/extruded in the sides of the extrusion to act as fins and increase surface area of extrusion 12. Standard sizes and configurations are made, but in accordance with a light source channel 10, an infinite possibility of combinations and variations on the existing design can be configured to meet the specific power requirements, heat requirements, and application requirements of a specific system. Unlike other systems, embodiments of the present invention are based around the need of the customer and are completely customizable in order to maximize the useful light while minimizing cost. Multiple sizes of extrusions and acrylic lenses are usable in conjunction with embodiments according to the present invention.

Figure 2:
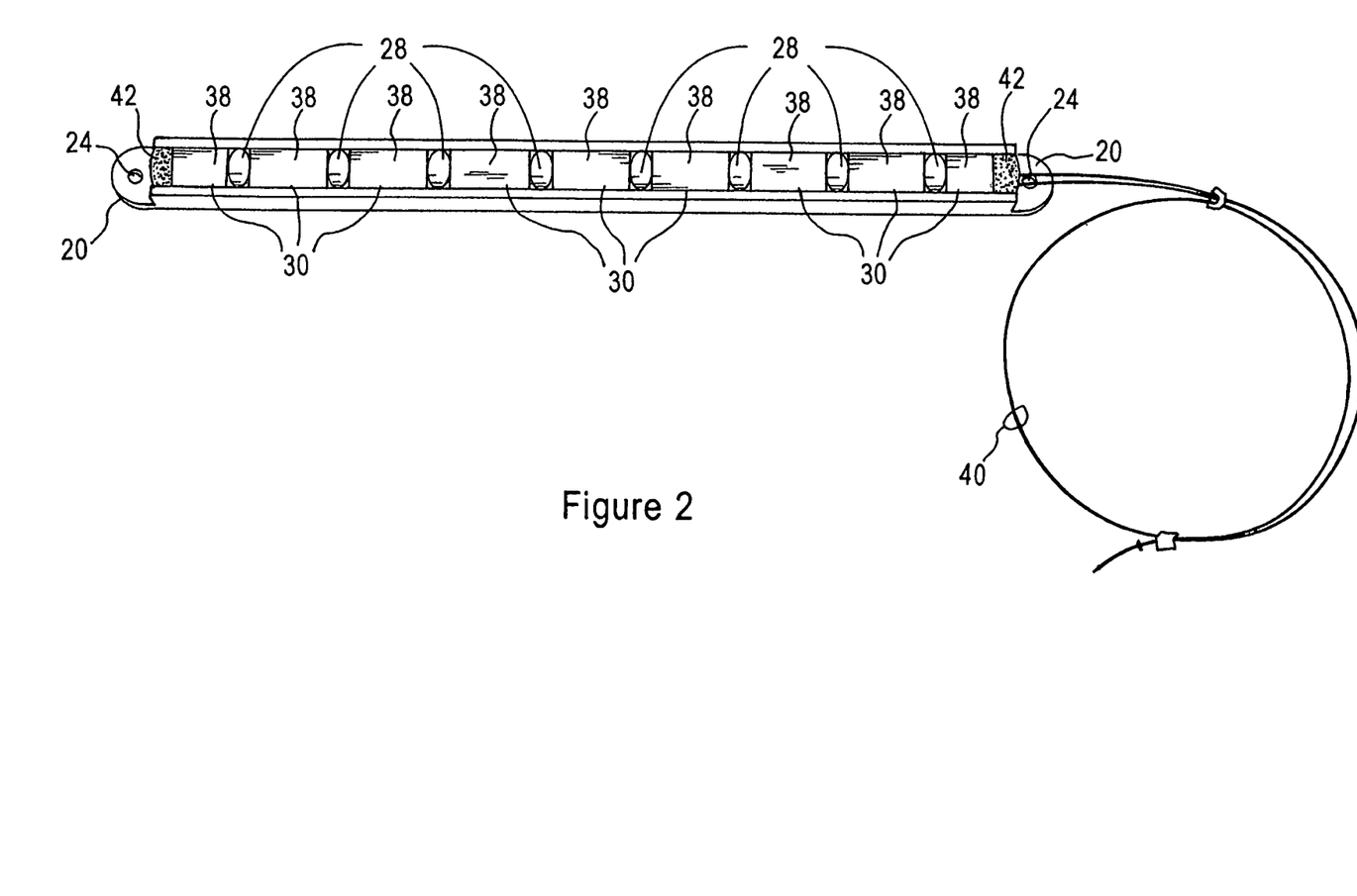
FIG. 2 is a top and side view of the FIG. 1 embodiment.
Figure 3:
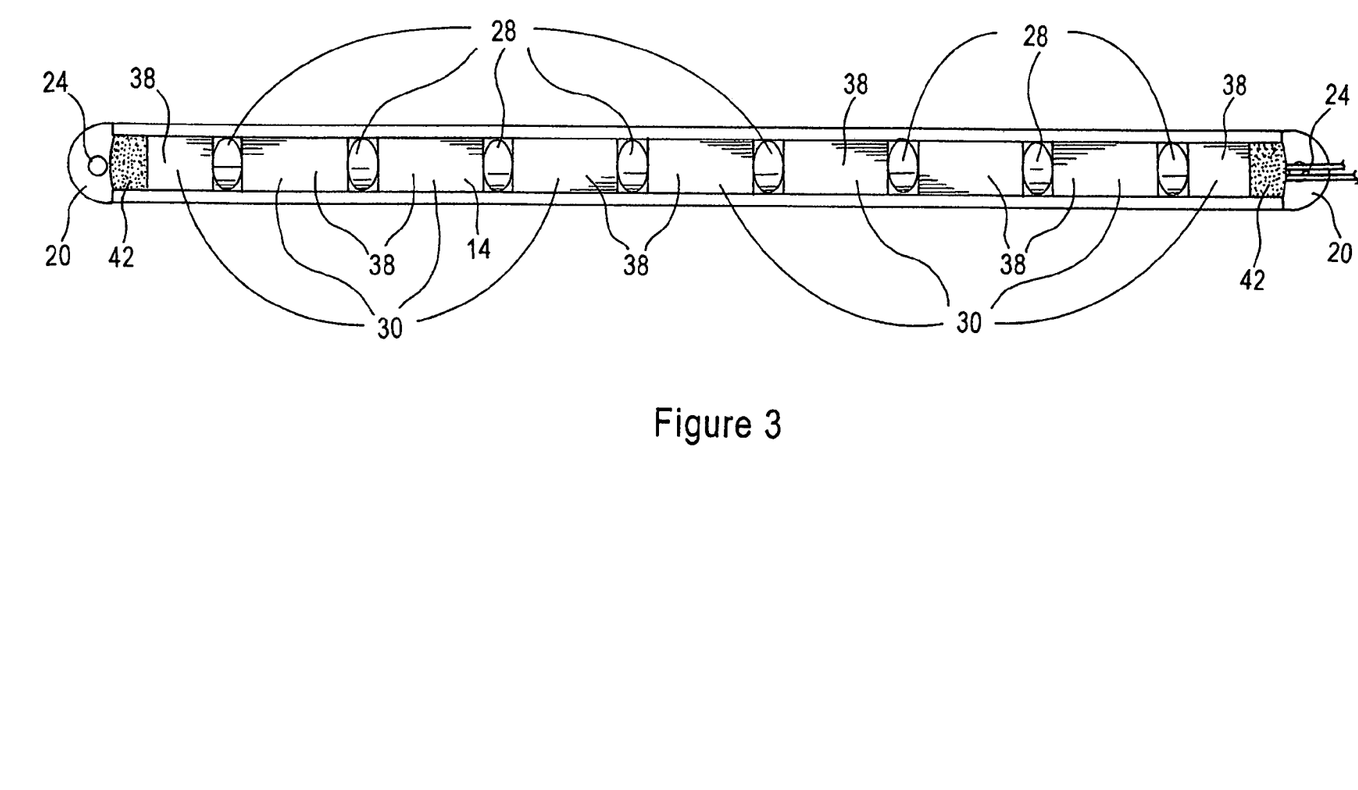
FIG. 3 is a top view of the FIG. 1 embodiment.

The body of extrusion 12 is mounted via various methods. One method utilizes a cast extrusion in which mounting holes, e.g., holes 24 described above, are cast and machined on the ends of the strip as shown in FIGS. 1-3. Longer strips requiring additional heat sinking, pemserts/pem studs are mounted through the bottom of the extrusion to an external heat sink prior to the window/lens covering the LED emitters. This increases contact of extrusion 12 with the external heat sink for optimal heat transfer.

In embodiments requiring external heat sinking, extrusion 12 is attached to the additional heat sink or heat transferring body (not shown) by various methods, but not limited to, the above-discussed screwing/fastening the body of extrusion 12 to the heat sink. Additionally, in alternate embodiments, a thermal medium (not shown) such as a thermally conductive epoxy, thermally conductive transfer tape (such as those from 3M or Thermagon), or a thermally conductive grease is applied between extrusion 12 and the external heat sink. The thermal medium should be as thin as possible in order to decrease thermal resistance but at the same time fill gaps, scratches, and texture of extrusion 12 and the external heat sink. Extrusion 12, e.g., an aluminum extrusion, may also be cooled via active cooling such as installation inside refrigeration units or other traditionally low temperature environments.

In a further embodiment, a plurality of LEDs and LED MCPCBs/PCBs or OLED, LEP-based light sources exist within light source channel 10. The need for multiple PC boards within one extrusion is driven by the manufacturing limit of the individual PC boards. For example, 8' (eight feet) of light emitting area may require 8, 12" (twelve inch) PC boards. In such cases, LEDs 28 on these boards in alternate embodiments are wired in series, parallel, and/or series-parallel combinations. When dealing with quantities of high powered LEDs 28 wired in series, multiple LED drive units (not shown) are used, as detailed below. In one embodiment, multiple wires are used for multiple drivers. Therefore, for longer extrusions, a wire harness for each additional light source channel 10 is laid/fastened/adhered inside of extrusion 12. For larger harnesses, a channel is cast, machined, or extruded into extrusion 12 to lay the wire harness into in order to avoid interference with the light emitted by the light engine 14 and to promote internal aesthetic appearance.

In an alternate embodiment, the PCB or MCPCB replaces the above-described wires interconnecting boards by copper traces on circuit board 30. Each circuit board plugs into each other via connectors mounted at each end of circuit board 30. Jumpers or zero Ohm resistors may be used to select which pins or sockets of the connector carry current to the LEDs thereby determining which and how many LEDs are powered. This method of powering LEDs within extrusion 12 eliminates the need for wires and harnesses and conserves space, simplifies the manufacturing process, and removes extra connections all of which are additional points of possible electrical or mechanical failure.

Most LED systems utilizing high power LEDs as such are most often utilized in systems with external driving/powering electronics. An embodiment according to the present invention described utilizes two types of driving systems. One way of using the system is the traditional method of using an external power supply connected to extrusion 12 using electrical conductors 40. However, an alternate embodiment of the present invention includes the driving system inside extrusion 12.

The drive system is mounted inside extrusion 12 in two methods. A first method mounts an LED SmartDriver (the subject of U.S. Provisional Patent Application No. 60/560, 294 filed Apr. 8, 2004, incorporated by reference in its entirety herein) inside the actual extrusion 12 near the LEDs 28. The second method, and generally more efficient manner, is to mount the actual drive circuitry, e.g., the circuitry of the SmartDriver, on the same MCPCB/PCB on which LEDs 28 are mounted. This method eliminates wiring, eliminates external drivers, and saves space. The use of a metal core PCB also transfers the heat generated from the power components of the driver to the rest of extrusion 12 acting as a heat sink allowing the driver to be run at higher ambient temperatures and efficiencies.

This system is not only new, but is an improvement on the inefficiencies of existing designs using extrusions as a housing for LEDs. Because of the ability to more accurately control and collimate the light, much of the loss from light scattered within the extrusion and diffused while exiting the extrusion is eliminated.

Further advantageously, in comparison with similar patents including "lens stripes" to collimate light is the present approach's low cost versatility. According to one embodiment, the lenses are stock acrylic half rounds and corner angles already extruded in various sizes and lengths. The utilization of an already existing material manufactured in great lengths easily allows custom cut lengths for custom rails. No custom tooling or special primary optical design is required although in alternate embodiments custom designed molds and optics are utilized for greater efficiencies.

With the appropriate LED driving techniques and system, the units are made of custom lengths and wired in series or parallel or a combination of the two. The quick disconnects at the ends of each of the extrusions in the system allow for easy coupling of units together via quick disconnects or other means of electrical connection including waterproof contacts and connectors. For longer lengths, if the LEDs 28 are not all able to be wired in series, proper wire management allows for a harness to be inserted into the extrusion that runs parallel to the strip of LEDs 28. A light system according to the present invention enables runs of great continuous distances with no breaks, interconnections, shadows or spaces.

In alternate embodiments, the light source channel 10 is equipped as having either indoor or outdoor (waterproof) specifications. With an indoor system, the half round is easily slid into the extrusion via a track, e.g., groove 36, and the ends are plugged with inserts 42 (FIGS. 1 and 3), e.g., rubber stoppers. For waterproof designs, the extrusion is potted via an optical or clear epoxy (or any silicone or other sealant).

One method for rapid production of the light source channel 10 includes an ultraviolet (UV) curing adhesive. The adhesive is dispensed between the junction of the half round and the extrusion 12. Next, extrusion 12 is placed on a conveyer belt and fed through an automated UV curing oven. The epoxy cures in less than 10 seconds.

Manufacturing of the system is performed quickly and at a low cost due to the materials involved and the method of manufacture. Extruded materials such as acrylic and aluminum or other metallic is performed cost effectively and in large lengths and the systems are customizable simply by cutting the extrusions to length. LEDs 28 are placed, epoxied (when applicable), and soldered via an automated pick and place machine as well as the driver components (when applicable). The light engine 14, e.g., PC board including LEDs, is then fastened or epoxied to extrusion 12.

In alternate embodiments, LED 28 placement inside extrusion 12 is staggered, linear, and a combination of staggered and linear.

Light source channel 10 is not limited to using a half round of polished acrylic for light transfer medium 16. Alternate embodiments include using a flat window, convex lens, round lens, triangular lens or any other acrylic, polycarbonate or clear composite material for transferring, diffusing, or refracting, or collimating light.

Advantageously, an embodiment according to the present invention:
  Enables use of LEDs, OLEDs, LEPs and related semiconductor materials as a light source;
  Provides a completely expandable system;
  Enables changing the radiation pattern;
  Enables any size extruded U channel L×W, and any size round or other shape to direct and collimate light;
  Wiring to LEDs can be enclosed inside the extrusion;
  Usable with any type of Light Emitting Diode regardless of Power; and
  Usable Indoor/Outdoor.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A system for collimating light emitted from a plurality of light source dies traversing a light transfer medium and averaging color temperatures of portions of the light emitted from the plurality of light source dies, the system comprising:
  an extrusion forming a channel having an open length;
  a drive system mounted on a circuit board inside the extrusion;
  a plurality of light source dies positioned within the channel and mounted on the same circuit board as the drive system, wherein a first light source die of the plurality of light source dies emits a first light having a first color temperature different from a second color temperature of a second light emitted by a second light source die of the plurality of light source dies;
  a light transfer medium positioned above the plurality of light source dies and covering at least a part of the open length of the extrusion, the light transfer medium having a bottom side and a rounded top side having a diameter;
  wherein the height of the extrusion is configured to position the bottom side of the light transfer medium a predetermined distance of an air gap from a surface of each of the light source dies of the plurality of light source dies;
  wherein the diameter of the rounded top side is configured in combination with the predetermined distance of the air gap between the surface of each of the light source dies and the light transfer medium to establish a particular emitting angle of a plurality of emitting angles of the first light and the second light traversing the light transfer medium; and
  wherein the light transfer medium based on the diameter of the rounded top side and the distance of the air gap between the surface of each of the light source dies and the light transfer medium collects and collimates along a length of the light transfer medium covering the channel of the extrusion the first light and the second light within the emitting angle and average the first color temperature of a first portion of the first light with the second color temperature of a second portion of the second light.

2. The system of claim 1 wherein the channel further comprises a plurality of sides wherein at least one of the plurality of sides comprises a first reflective surface and wherein the first portion of the first light and the second portion of the second light reflect off the first reflective surface toward the bottom side of the light transfer medium.

3. The system of claim 2 further comprising a second reflective surface and wherein the first portion of the first light reflects off the first reflective surface toward the bottom side of the light transfer medium and the second portion of the second light reflects off the second reflective surface toward the bottom side of the light transfer medium.

4. The system of claim 2 wherein the distance of the air gap of the light transfer medium determines a range of collimation of the first portion of the first light and the second portion of the second light emanating through the light transfer medium.

5. The system of claim 1 wherein the extrusion provides a heat sink for the plurality of light source dies positioned within the channel.

6. The system of claim 1 wherein the extrusion provides an intermediary heat sink for an external heat sink.

7. The system of claim 1 wherein the light transfer medium covers the length of the extrusion and comprises a single optical cover for collimating the light emitted by each one of the plurality of light source dies.

8. The system of claim 1 wherein the channel further comprises one of a printed circuit board for controlling one or more of the plurality light source dies or a plurality of printed circuit boards for controlling the plurality of light source dies.

9. The system of claim 8 wherein the channel further comprises a drive system mounted inside the channel to eliminate one of wiring or an external driver for the printed circuit board.

10. The system of claim 1 further wherein the extrusion and the light transfer medium are potted with one of an epoxy or a sealant to provide waterproofing.

11. A method of collimating light emitted from a plurality of light source dies traversing a light transfer medium and averaging color temperatures of portions of the light emitted from the plurality of light source dies, the method comprising steps of:
    providing, by a lighting system, an extrusion forming a channel having an open length, a drive system mounted on a circuit board inside the extrusion and housing a plurality of light source dies mounted on the same circuit board as the drive system, the lighting system comprising a light transfer medium having a bottom side and a rounded top side with a diameter, the height of the extrusion configured to position the bottom side of the light transfer medium a predetermined distance of an air gap from a surface of each of the light source dies of the plurality of light source dies housed by the extrusion;
    emitting, by a first light source die of the plurality of light source dies, a first light having a first color temperature different from a second color temperature of a second light emitted by a second light source die of the plurality of light source dies;
    collecting and collimating, by the light transfer medium along the length of the light transfer medium covering the channel of the extrusion the first light and the second light traversing the light transfer medium within a particular emitting angle of a plurality of emitting angles based on the combination of the configured diameter of the light transfer medium and the predetermined distance of the air gap; and
    averaging, by the light transfer medium based on the diameter and the distance of the air gap, the first color temperature of a first portion of the first light with the second color temperature of a second portion of the second light.

12. The method of claim 11 further comprising reflecting, by a first reflective surface of a side of a plurality of sides comprised by the channel, the first portion of the first light emitted from the first light source and the second portion of the second light emitted from the second light source toward the bottom side of the light transfer medium.

13. The method of claim 12 wherein a second reflective surface of a plurality of sides comprised by the channel reflects the second portion of the second light from the second light source toward the bottom side of the light transfer medium.

14. The method of claim 12 further comprising diffusing, by the light transfer medium based on the distance of the air gap, the first portion of the first light and the second portion of the second light emanating through the light transfer medium.

15. The method of claim 11 wherein the extrusion provides a heat sink for the plurality of light source dies positioned within the channel.

16. The method of claim 11 wherein the extrusion provides an intermediary heat sink for an external heat sink.

17. The method of claim 11 further wherein light transfer medium covers the length of the extrusion and comprises a single optical cover for collimating the light emitted by each one of the plurality of light source dies.

18. The method of claim 11 wherein the lighting system comprises a printed circuit board inside the channel to control one of or more of the plurality of light source dies.

19. The method of claim 11 wherein the lighting system comprises a drive system mounted inside of the channel to provide one of a driver or a connection for the printed circuit board.

20. The method of claim 11 wherein the extrusion and the light transfer medium are potted with one of an epoxy or a sealant to provide waterproofing.

21. A lighting unit housing a plurality of light source dies and having a light transfer medium controlling collimation of light emitted from each of the light source dies and averaging color temperatures of light emitted from the light source dies, the lighting unit comprising:
    an extrusion forming a channel having an open length, the extrusion housing a plurality of light source dies and a printed circuit board comprising a drive system controlling one or more of the light source dies of the plurality of light source dies mounted on the printed circuit board inside the extrusion;
    a first light source die of the plurality of light source dies emitting a first light having a first color temperature different from a second color temperature of a second light emitted by a second light source die of the plurality of light source dies;
    a reflector on an upper surface of the printed circuit board inside the extrusion, the reflector reflecting portions of the first light and the second light;
    a light transfer medium positioned above the plurality of the plurality of light source dies and covering at least a part of the open length of the extrusion, the light transfer medium having a bottom side and a rounded top side having a diameter, the height of the extrusion is configured to position the bottom side of the light transfer medium a predetermined distance of an air gap from a surface of each of the light source dies of the plurality of light source dies;
    the diameter of the rounded top side is configured in combination with the predetermined distance of the air gap between the surface of each of the light source dies and the light transfer medium to establish a particular emitting angle of a plurality of emitting angles of the first light and the second light traversing the light transfer medium; and
    the light transfer medium based on the diameter and the distance of the air gap between the surface of each of the light source dies and the light transfer medium collecting and collimating along the length of the light transfer medium covering the extrusion the first light and the second light within the emitting angle and averaging the first color temperature of a first portion of the first light with the second color temperature of a second portion of the second light.

22. The lighting unit of claim 21 wherein the channel further comprises a plurality of sides wherein at least one of the plurality of sides comprises a first reflective surface and wherein the first portion of the first light and the second portion of the second light reflect off the first reflective surface toward the bottom side of the light transfer medium.

23. The lighting unit of claim 22 further comprising a second reflective surface wherein the second portion of the second light reflects of the second reflective surface toward the bottom side of the light transfer medium.

24. The system of claim 1, further comprising a reflector on an upper surface of the printed circuit board inside the extrusion, the reflector reflecting portions of the first light and the second light.

\* \* \* \* \*